F. STODDARD.
SURVEYING INSTRUMENT.
APPLICATION FILED MAR. 28, 1914.

1,100,698.

Patented June 16, 1914.

Witnesses.
John C. Sanders
Albert F. Heuman

Inventor.
Fred Stoddard
By his Attorney, M. Wallace White

F. STODDARD.
SURVEYING INSTRUMENT.
APPLICATION FILED MAR. 28, 1914.
1,100,698.
Patented June 16, 1914.
3 SHEETS—SHEET 2.
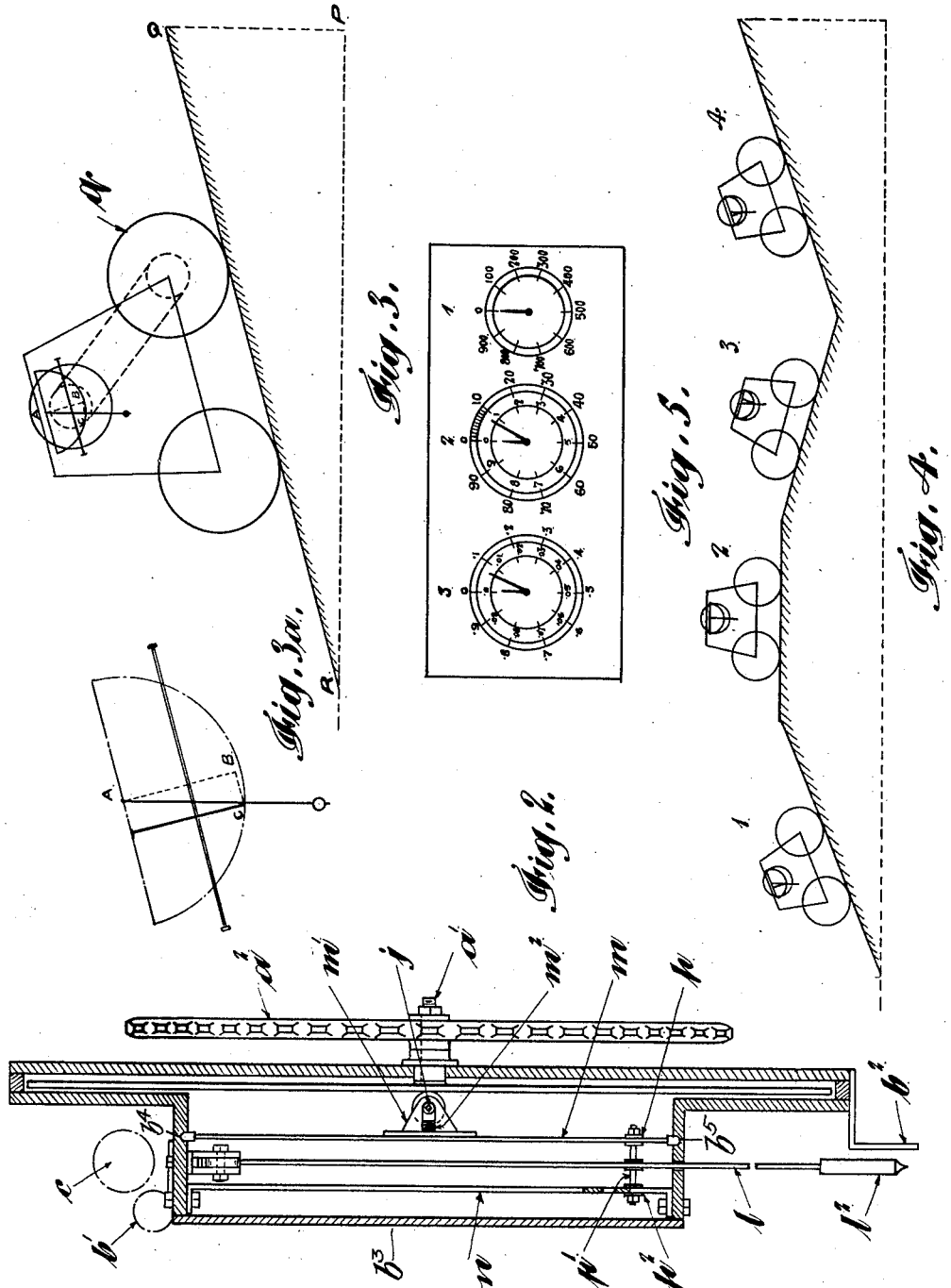

UNITED STATES PATENT OFFICE.

FRED STODDARD, OF ALNWICK, ENGLAND.

SURVEYING INSTRUMENT.

1,100,698.  Specification of Letters Patent.  Patented June 16, 1914.

Application filed March 28, 1914.  Serial No. 827,805.

*To all whom it may concern:*

Be it known that I, FRED STODDARD, a subject of the King of Great Britain and Ireland, and resident of Alnwick, Northumberland, England, have invented a new or Improved Surveying Instrument, of which the following is a specification.

This invention refers to and consists of a new or improved construction of surveying instrument for automatically giving a direct and accurate reading of the "fall" of land above or below a datum, the invention relating to surveying instruments of the perambulating type in which a tractor wheel is moved across the surface of a rotating disk.

In the known type of instrument the record has been in the form of a chart giving a graphical delineation of the grade, the "fall" of land above or below a datum having to be scaled from the chart, whereas by this invention the record is not represented graphically but by an actual reading. Further, in the known type of instrument the distances at which the tractor wheel may lie on each side of the center of the disk are proportionate to the fall of the slope (which does not give an accurate reading), while in this invention the distance that the tractor wheel may lie on each side of the center of the disk are proportionate to the sine of the angle of slope. The improved instrument may also be adapted for the horizontal measurement of sloping ground, in which case the distances at which the tractor wheel may lie on each side of the center of the disk will be proportionate to the cosine of the angle of declivity or slope.

The features of this invention are hereinafter described and claimed and illustrated on the accompanying drawings wherein:

Figure 1 illustrates a side elevation (with the front part or cover removed), and Fig. 2 a sectional end view of the improved instrument and being shown horizontal in Fig. 2. This view is taken on the section line 2—2 of Fig. 1 looking in the direction of the arrow. Figs. 3, 3ª and 4 illustrate small diagrams of the instrument and a bicycle-like machine to which the instrument may be applied. Fig. 5 illustrates to a large scale a face view of the dials and pointers by which the level of the land is indicated. Figs. 6, 7 and 8 illustrate in diagram modifications hereinafter described.

According to the invention, the instrument comprises a wheel or disk $a$. This disk is mounted within a housing or casing $b$, the casing being formed in two or more parts to admit the disk, and being provided with a cover $b^3$ to inclose the disk and the other working parts. The front part of the casing is of rectangular shape while the rear part is circular.

When the instrument is in use the casing will be adjustably fixed to a vehicle, preferably of bicycle type. In the example shown in Fig. 1, the tube $c$ represents the horizontal member of a bicycle frame, and the casing $b$ is secured thereto at one end by a clamp $d$ and at the other end by a clamp $e$, this latter also comprising a lug $f$, right-and-left handed screw $g$ and nuts $h$. The casing is connected to clamp $d$ by a hinge pin $i$ so that, by adjusting the nuts $h$, the casing may be readily adjusted relatively to the land.

On the top of the casing is fitted a level $b'$ so that when the vehicle stands on a horizontal plane the instrument may be adjusted to suit, while on the lower circular part of the casing is a dial $b^2$ for additionally checking the horizontality of the casing. The disk $a$ is mounted in an axis $a'$ which passes through the rear wall of the casing and is there provided with a chain wheel $a^2$. By means of this wheel and an endless chain, the disk is adapted to be rotated from the road vehicle, see Figs. 3 and 4.

Arranged alongside the front face of the disk, and mounted at or near each end in bearings carried by the casing, is a spindle or shaft $j$, a line following a prolongation of the axis of the disk $a$ intersecting the longitudinal axis of the shaft $j$, and this latter lying parallel to a straight line joining the two points at which the wheels of the vehicle touch the ground, and also lying parallel to the plane of the disk $a$. At one end the shaft $j$ is fitted with a toothed wheel $k$ which forms the driving member of a train of toothed wheels for operating the fingers or pointers of an indicator, see Figs. 1 and 5. Upon the dial are marked the degrees and numerals representing the standard of measurement in which the surveying is to be calculated. There will preferably be three dials 1, 2, 3; the dial 1 will have one pointer and indicate hundreds of feet; the dial 2 will have two pointers and indicate tens and units of feet, while the dial 3 will also have two pointers and be provided with markings to represent tenths and hundredths of feet.

At a point above the shaft $j$ and in the same vertical plane as the axis of the disk $a$, is the pivot from which hangs a pendulum $l$ provided with a pointer $l'$ free to swing in a plane parallel to the plane of the disk. On this same side of the disk the housing or casing is formed with two grooves $b^4$, $b^5$, see Fig. 2, equi-distant from and parallel with the axis of the shaft $j$. Mounted to slide to and fro in the said grooves is a slotted cross-bar $m$, and formed in one with or fitted to the casing $b$ is a fixed slotted and curved guide $n$, the radius of which is struck from the pivot of the pendulum $l$. The cross-bar and curved guide $n$ cross each other, and the length of the curved guide is such as to allow of the cross-bar moving from a point coincident with the center of the disk $a$ to a point near the ends of the grooves. Upon the shaft $j$, which is square in cross-section, is a pinion or tractor wheel $o$, which normally bears against the face of the disk $a$, and, when the disk is rotated, rotates the shaft $i$. This tractor wheel, while designed to rotate the shaft $j$, is free to move along the shaft. Upon the cross bar $m$ are brackets $m'$, which lie to right and left of the tractor wheel, and with the movements of the cross-bar to right and left move the tractor wheel along the shaft $j$. Within the slot of the cross-bar $m$ is a small slide block $p$ and extending from such block is a pin or stud $p'$. This stud extends loosely through a hole in the pendulum $l$ and is connected to a further slide block $p^2$ in the slot of the fixed curved guide $n$.

The use and operation of the improved instrument may be described as follows:—With the ratios of the indicator gearing proportioned to the required movements of the indicator finger for various "falls" of land, which may be determined by experiment, the bicycle or other vehicle carrying the instrument is placed at a point corresponding to the level of the base line of the triangle of which the "fall" of the land will form the vertical. At such point the fingers of the indicator will be at zero. The bicycle is then wheeled forward and upward until it reaches the highest point from which the fall of the land is to be measured. As the bicycle is propelled forward and upward, the instrument automatically registers the "fall" of the land which may be read off from the dial. With an increase in the angle of the land as the vehicle moves forward the shaft $j$ becomes more inclined, and owing to the pendulum remaining vertical, increases the distance between the center of the disk $a$ and the tractor wheel $o$, this distance always varying with the sine of the angle of inclination, thus causing the shaft $j$ to be rotated more rapidly. With a decrease in the angle of the land as the vehicle moves forward the shaft $j$ becomes less inclined, thus reducing the distance between the center of the disk and tractor wheel and thereby reducing the rotations of the shaft $j$. In thus automatically varying the rotations of the shaft $i$ according to the variations in the angularity of the land, the instrument is adapted to integrate the variations in the level of the land and thereby give a correct measurement of the total "fall" at any point.

Fig. 3 illustrates an example of the use of the instrument. In such view the land to be leveled is represented in triangle PQR, RP representing the base line, RQ the slope of the land, and QP the "fall" of the land. The instrument being placed at a point corresponding to the horizontal base line RP, the shaft $j$ lies horizontal and the tractor wheel lies directly opposite the center of the rotor disk. As the instrument is moved forward and upward the shaft $j$ becomes tilted relatively to the base line RP, while the pendulum remains vertical, thus causing the cross-bar $m$ to move the tractor wheel $o$ away from the center of the disk. In such altered position of the tractor wheel it rotates as the vehicle moves forward at a rate proportional to the "fall" of the land and thus, on the vehicle reaching the highest point, the instrument indicates the total "fall."

Fig. 4 shows the instrument used for measuring the fall of undulating land and serves to illustrate the manner in which the position of the tractor wheel, relatively to the disk center, varies with the slope of the land either downward or upward. In the first position the instrument is shown moving over rising ground and the tractor wheel lying to the left of the disk center, in the second position the instrument is shown traveling along level ground and with the tractor wheel opposite the center of the disk and therefore out of action, in the third position the instrument is shown moving over downwardly sloping ground and the tractor wheel lying to the right of the disk center, while in the fourth position the instrument is again shown moving over rising ground with the tractor wheel to the left of the disk center. Thus, as the instrument moves first up and then down, the position of the tractor wheel is varied and the speed of the shaft $j$ varied in the ratio of the inclination of the land to the "fall" of the land at any given point.

With the stud $p'$ fixed to the pendulum the curved slotted guide $n$ may be dispensed with. The casing $b$ will be of metal. The tractor wheel may be rubber-tired, or be made with a milled edge, likewise, the face of the disk may be roughened. The required contact of the tractor wheel with the disk is insured by springs $m^3$ arranged on the slots in the brackets $m'$ see Fig. 2. While for use in determining the level of land above a datum the instrument will be adapted in a similar manner for finding the horizontal measurement of sloping ground. In the first case the varying distances between the center of the disk and the tractor wheel are proportional to the sine of the angle of declivity, and in the second case they will be proportional to the cosine of the angle of declivity.

Fig. 6 illustrates in diagram, the arrangement of the parts when the instrument is to be used for finding the horizontal measurement of sloping ground. The cross-bar $m$ in this case is arranged at right angles to the spindle $j$ and the pendulum $l$ acts upon the cross-bar through an arm $l^2$. The slotted curved guide $n$ is arranged with its ends above and below the axis of the pendulum. The tractor wheel $o$ in this arrangement moves only on one side of the center of the disk, since the distance readings will all be "additions," the only "subtractions" being when the machine is wheeled backward. When the instrument is moving horizontally the tractor wheel will be at its farthest distance from the disk center, and as the angle of slope changes, the tractor wheel will move toward the center of the disk, its distance from the center always being proportional to the cosine of the angle of declivity or slope.

What I claim is:—

Figure 1:
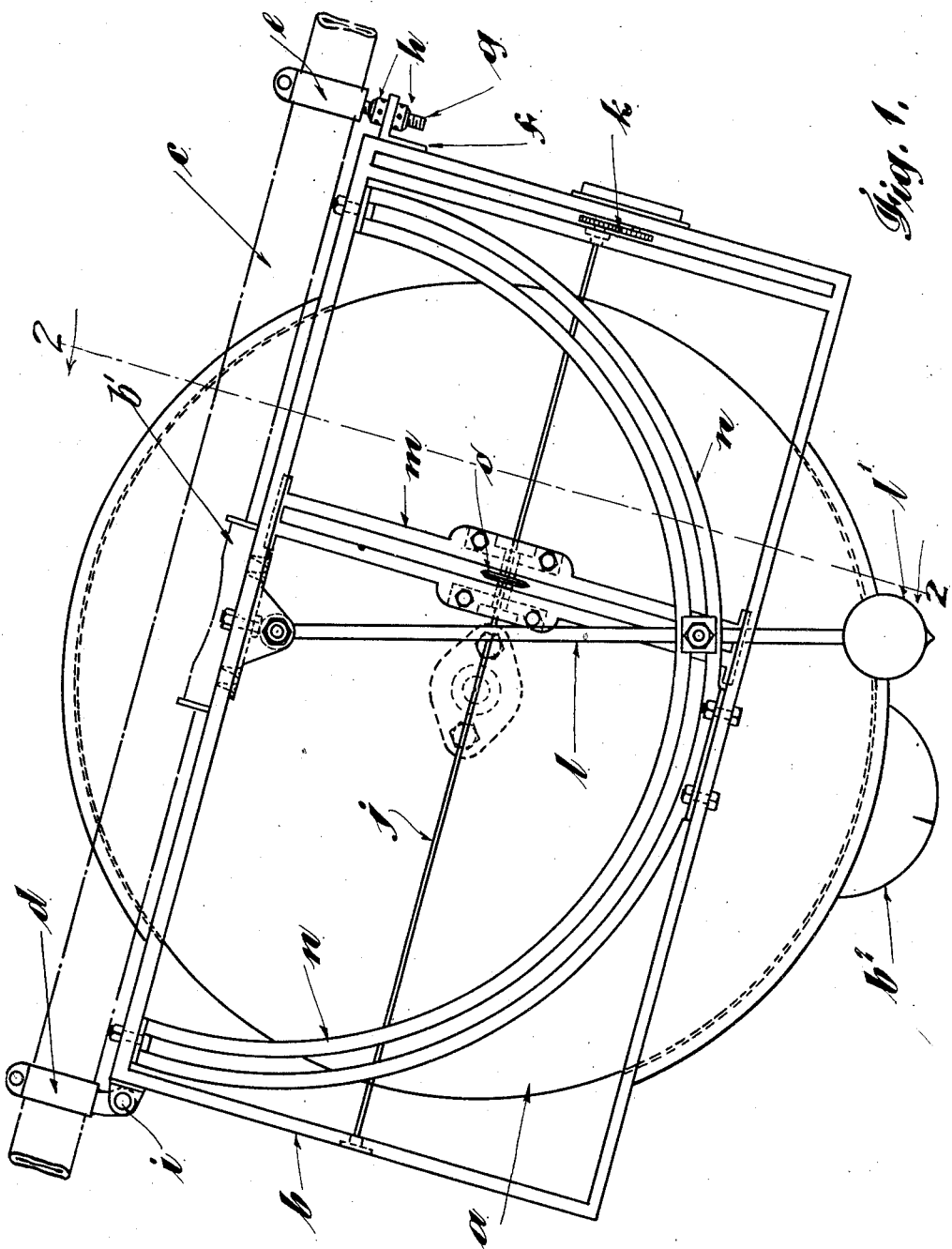
Figure 6:
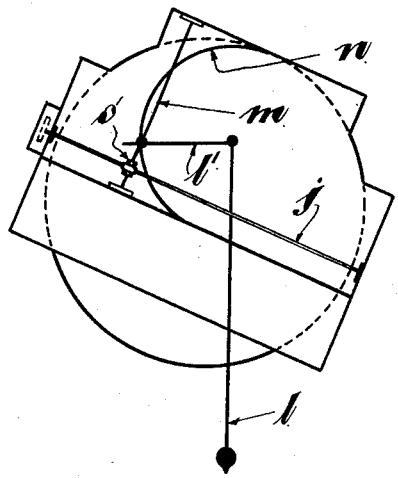
Figure 7:
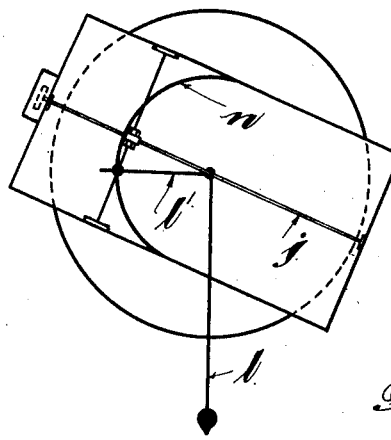
Fig. 7 illustrates in diagram, another arrangement, the pendulum being mounted on the axis of the disk, instead of on the axis of the level pendulum as in Fig. 6.
Figure 8:
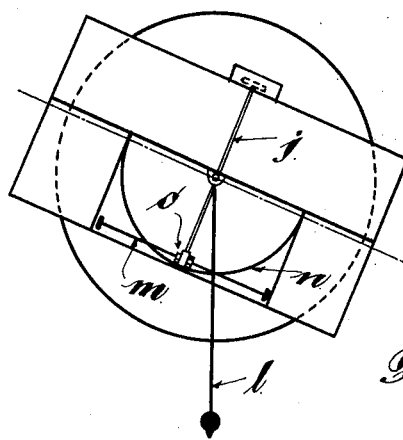
Fig. 8 illustrates in diagram, a further arrangement, the tractor wheel $c$ and cross bar $m$ in this case moving upwardly and downwardly as the angle of slope changes.

1. A surveying or like instrument comprising, in combination, a road vehicle, a vertically disposed casing carried by and stationary with respect to said vehicle, a disk rotatably supported therein, means for rotating the disk, a shaft also rotatably supported at each end in the said casing but at right angles to the axis of the disk and parallel to the direction of movement of the vehicle, a slotted cross-bar slidably mounted in the casing, a tractor pinion wheel slidably mounted upon the said shaft and adapted to make frictional contact with the disk, gearing and indicator means connected with the shaft, a pendulum pivotally supported by the casing at a point above the axis of the disk, and means whereby the pendulum may engage the cross-bar and through the cross-bar hold the tractor pinion wheel central to the disk when the shaft is horizontal and move it along the shaft to right or left when the shaft and casing are tilted, substantially as herein set forth.

2. In a surveying instrument, the combination of a vehicle, a vertically disposed casing carried by and stationary with respect to said vehicle, a disk and shaft rotatably supported therein, the shaft lying near to and parallel with the face of the disk and with the direction of movement of the vehicle, a slotted cross-bar slidably mounted in the said casing, a tractor pinion wheel slidably mounted upon the said shaft, a pendulum pivotally supported by the casing, a curved slotted guide parallel with the disk and secured to the casing, a slide block in the said cross-bar and guide bar respectively and a pin passing through the pendulum and the slide blocks, substantially as herein set forth.

3. In a surveying instrument, the combination of a vehicle, a vertically disposed casing carried by and stationary with respect to the vehicle, means for adjusting the casing in relation to the vehicle, a spirit level for facilitating the adjustment of the casing, a dial secured to the casing for checking the horizontality of the casing, a disk and shaft rotatably supported therein, the shaft lying near to and parallel with the face of the disk and with the direction of movement of the vehicle, a slotted cross-bar slidably mounted in the said casing, a tractor pinion wheel slidably mounted upon the said shaft, a pendulum pivotally supported by the casing, a curved slotted guide parallel with the disk and secured to the casing, a slide block in the said cross-bar and guide bar respectively and a pin passing through the pendulum and the slide blocks, substantially as herein set forth.

In witness whereof I have hereunto set my hand in the presence of two witnesses.

FRED STODDARD.

Witnesses:
A. MITCHINSON,
H. J. AMUNDSEN.